United States Patent Office 2,938,010
Patented May 24, 1960

2,938,010
PROCESS FOR CURING SILICA CONTAINING ORGANO POLYSILOXANE ELASTOMERS WITH AMINES AND PRODUCT OBTAINED

Ben A. Bluestein, Schenectady, N.Y., assignor to General Electric Company, a corporation of New York No Drawing. Filed Apr. 12, 1956, Ser. No. 577,630

13 Claims. (Cl. 260—37)

This invention is concerned with the curing of organopolysiloxanes convertible to the cured, solid, elastic state. More particularly, the invention relates to a curable composition of matter comprising (1) a hydrocarbon-substituted polysiloxane having a viscosity above 100 centipoises and convertible to the cured, solid, elastic state in which the monovalent hydrocarbon groups are attached to silicon by carbon-silicon linkages, there being present an average of from about 1.98 to 2.05 monovalent hydrocarbon radicals per silicon atom, (2) a finely divided silica filler, and (3) a curing agent for (1) comprising a primary amine selected from the class consisting of primary aliphatic and aromatic amines.

One of the more largely used methods for curing organopolysiloxane elastomers to the cured, solid, elastic state (also known as vulcanizing) involves the use of organic peroxides in amounts ranging from about 1 to 5 percent or more, by weight, based on the weight of the convertible organopolysiloxane. However, often the time required to obtain a complete cure using the organic peroxides is excessively long and the temperatures required for obtaining such a degree of cure are usually exceedingly high, generally of the order of 150° C. or higher. In addition, these organic peroxides are not able to give a satisfactory cure at lower temperatures, for instance, at temperatures ranging from about 25 to 50° C., where it might be desirable to use the organopolysiloxane elastomers.

Unexpectedly, I have discovered that I am able to obtain rapid cure with certain organic amines of organopolysiloxanes convertible to the cured, solid, elastic state at temperatures lower than has heretofore been possible employing organic peroxides for the purpose. In addition, because of the fact that it is possible to obtain cures of the polysiloxane elastomer at the lower temperatures, I have found that the methods of cure employing the amines herein described can be used in applications where it is desired to calk spaces between surfaces to obtain heat-resistant joints.

In the specification and claims, for brevity, the convertible organopolysiloxanes, which are benzene-soluble and which may be viscous masses or gummy solids (depending on the state of condensation of the starting organopolysiloxane, polymerizing agent, etc.), will hereinafter be referred to as "convertible organopolysiloxanes" or, more specifically, as "convertible methylpolysiloxanes." Although convertible organopolysiloxanes with which the present invention is concerned are now well known in the art, for the purpose of showing the various convertible organopolysiloxanes which may be employed in the practice of the present invention, attention is directed to the convertible organopolysiloxanes disclosed in Agens Patent 2,448,756 and Sprung et al. Patent 2,448,556, the latter two patents being issued September 7, 1948; Sprung Patent 2,484,595 issued October 11, 1941; Krieble et al. Patent 2,457,688 issued December 28, 1948; Marsden Patent 2,521,528 issued September 5, 1950; all the foregoing patents being assigned to the same assignee as the present invention; Hyde Patent 2,490,357 issued December 5, 1949; and Warrick Patent 2,541,127 issued February 13, 1951. The disclosures are intended only for the purpose of showing examples of silicon-bonded hydrocarbon radicals.

It will, of course, be understood by those skilled in the art that other convertible organopolysiloxanes containing the same or different silicon-bonded organic substituents (e.g., methyl, ethyl, propyl, vinyl, allyl, phenyl, tolyl, xylyl, benzyl, phenylethyl, naphthyl, both methyl and phenyl, etc., radicals) connected to the silicon atoms by carbon-silicon linkages, may be employed in the present invention without departing from the scope of this invention. The particular convertible organopolysiloxane used is not critical and may be any one of those described in the foregoing patents generally obtained by condensation of a liquid organopolysiloxane containing an average of from about 1.98 to 2.05 hydrocarbon groups per silicon atom. The condensing agents which may be employed are well known in the art and include, for instance, ferric chloride hexahydrate, phenyl phosphoryl chloride; alkaline condensing agents, such as potassium hydroxide, sodium hydroxide, etc. Each convertible organopolysiloxane generally comprises a polymeric diorganosiloxane which may contain, if desired, for example, up to 2 mol percent copolymerized monoorganosiloxane, for example, copolymerized monomethylsiloxane, as well as small molar concentrations (e.g., up to 0.01 mol percent) of intercondensed triorganosiloxane units, e.g., trimethylsiloxy units. Generally, I prefer to use as the starting liquid organopolysiloxanes (or mixtures of organopolysiloxanes) from which the convertible, for example, heat-convertible organopolysiloxanes are prepared, ones which contain about 1.999 to 2.01, inclusive, organic groups, for example, methyl groups per silicon atom, and where preferably more than 50 percent, e.g., more than 75 percent, of the silicon atoms in the polysiloxane contain two silicon-bonded lower alkyl groups. The convertible organopolysiloxane thus prepared also advantageously contains silicon atoms to which at least 50 percent of the hydrocarbon groups attached thereto are lower alkyl radicals, e.g., methyl radicals.

The starting organopolysiloxanes used to make the convertible organopolysiloxanes advantageously comprise organic constituents consisting essentially of monovalent hydrocarbon radicals attached to silicon by carbon-silicon linkages, and in which essentially all the siloxane units consist of units of the structural formula $R_2SiO$ where R is preferably a radical of the group consisting of methyl, ethyl, and phenyl radicals. At least 50 to 75 percent of the total number of R groups are preferably methyl radicals. The polysiloxane may be one in which all the siloxane units are $(CH_3)_2SiO$, or the siloxane may be a copolymer of dimethylsiloxane with a minor amount (e.g., from 1 to 20 or more mol percent) of any of the following units, alone or in combination therewith: $C_6H_5(CH_3)SiO$ and $(C_6H_5)_2SiO$. The presence of small molar concentrations of silicon-bonded vinyl radicals is not precluded.

The organic primary amines employed as curing agents for the convertible organopolysiloxanes may be either monomeric or polymeric. The amines, as pointed out above, may be aliphatic or aromatic amines and may contain oxygen atoms in the chain in the form of, for instance, as polyether amines. The presence of substituents on the hydrocarbon portion of the amines which are inert and do not deleteriously affect the curing of the convertible organopolysiloxane is not precluded; among such inert substituents are, for instance, halogens, for example, chlorine, bromine, etc.

More specific examples of organic amines which may be employed in the practice of the present invention are, for instance, aliphatic amines, for example, ethylenediamine, diethylenetriamine, triethylenetetramine, tetraethylenepentamine, etc.; aromatic amines, for instance, bis(p-aminophenyl)methane, p,p-diaminobiphenyl, p- chloro-aniline, o-chloro-aniline, tolyl amine, etc.; bis-(aminoethoxyethyl) ether, etc.; aminomethyltrimethylsilane, aminomethylpentamethyldisiloxane, etc. Unexpectedly, it was found that if the organic amine was an aromatic amine containing a secondary amino group, no curing of the convertible organopolysiloxane was observed. More rapid curing occurs if there are present two or more primary amino groups.

The amount of organic amine employed for curing purposes is preferably varied within from about 0.1 to 10 percent, by weight, based on the weight of the convertible organopolysiloxane. More rapid cures will be obtained as the amount of organic polyamine increases. In addition, larger amounts of the organic amine would permit curing of the convertible organopolysiloxane rapidly at room temperature of about 25 to 35° C.

Various finely divided silica fillers are incorporated in the convertible organopolysiloxane. Among such fillers are, for instance, diatomaceous earth, silica aerogel, fume silicas, precipitated silicas, etc. The amount of filler used may be varied widely. Generally, I prefer to employ, depending on the type of filler used, amounts of silica filler ranging from about 25 to 300 percent, by weight, based on the weight of the convertible organopolysiloxane. The use of other fillers in amounts less than 25 percent, by weight, of the weight of the silica fillers is not precluded. Examples of such fillers are, e.g., titanium dioxide, zirconium oxide, ferric oxide, zinc oxide, etc.

The organic amine vulcanizing agent may be incorporated in the convertible organopolysiloxane by any convenient method. This is usually done by adding the organic amine on rolls while milling the organopolysiloxane. Generally, because of the activity of the organic amine, it is desirable that the latter be added as the last of the ingredients used in making the curable composition. This will often occur after addition of the filler and any other modifying agent, such as dyes, pigments, stabilizers, compression set additives, etc. One method whereby this can be accomplished is to coat the filler with the organic amine and thereafter add the coated filler to the convertible organopolysiloxane.

Thereafter, depending on the activity of the organic amine and the concentration thereof in the convertible organopolysiloxane, the composition may be molded or used in any other application desired. When molding the mixture of ingredients comprising the convertible organopolysiloxane, the silica filler and the amine vulcanizing agent, pressures of from about 100 to 2000 p.s.i. or more may be employed in combination with temperatures ranging from about 50 to 150° C. or higher. Under such conditions, the time required for effecting the desired cure of the product may range in time from about a matter of a few seconds to as long as 30 minutes to one or more hours. It will be apparent to those skilled in the art that the temperature and the time required for effecting the desirable cure will depend upon such factors as the organic amine used, the concentration of the organic amine, the type of organopolysiloxane employed, the type and amount of filler used, the application intended, etc. Persons skilled in the art will have little difficulty in determining the optimum conditions under various situations involving a variety of temperatures, proportions and ingredients.

In order that those skilled in the art may better understand how the present invention may be practiced, the following examples are given by way of illustration and not by way of limitation. All parts are by weight.

In the following example, the convertible organopolysiloxane employed was prepared by heating octamethylcyclotetrasiloxane with about 0.01 percent, by weight thereof, potassium hydroxide at a temperature of about 135° C. for about 4 hours, to obtain a highly viscous, benzene-soluble mass of only slight flow. This material had a ratio of approximately two methyl groups per silicon atom and had a viscosity of about 6 million centistokes.

EXAMPLE 1

Formulations were prepared from 100 parts of the convertible methyl polysiloxane and 45 parts of silica aerogel (Santocel C manufactured by Monsanto Chemical Company). To this base mixture of ingredients were added varying amounts of different types of organic amines. The addition of the ingredients was carried out on a rubber compound roll in which the filler was added first and thereafter the organic amine added subsequently in the stipulated amount. Thereafter, the various mixtures of ingredients were pressed in a mold into the form of flat sheets for about 15 minutes at about 125° C., and the product thereafter heat-aged for 16 hours at 150° C. in an air circulating oven, and then tested for tensile strength, percent elongation, and tear strength. The following Table I shows the organic amine curing agent used, the concentration of said organic amine in which the parts, by weight, are based on 100 parts of the convertible methylpolysiloxane, and the properties of the heat-cured samples.

Table I

| Compound Number | Curing Agent | Parts Curing Agent | Tensile, p.s.i. | Percent Elongation | Tear Strength, Lbs. |
|---|---|---|---|---|---|
| 1 [1] | Benzoyl peroxide | 1.6 | 830 | 230 | 85 |
| 2 [1] | Diphenylamine | 1.0 | 0 | 0 | 0 |
| 3 | p-Aminobiphenyl | 1.0 | 270 | 230 | 87 |
| 4 | Bis(p-aminophenyl)methane | 1.0 | 920 | 600 | 92 |
| 5 | p,p'-Diaminobiphenyl | 1.0 | 410 | 280 | 81 |
| 6 | p-Chloroaniline | 1.0 | 630 | 400 | 81 |
| 7 | 1,6-diaminohexane | 1.0 | 480 | 300 | 82 |
| 8 | Tetraethylene pentamine | 1.0 | 450 | 310 | |

[1] These were samples outside the scope of the curing agents employed in the practice of the claimed invention.

It will, of course, be apparent to those skilled in the art that in addition to the amine curing agents employed in the foregoing example, other amines in varying percents, by weight, may be used, many examples of which have been given above, without departing from the scope of the invention. In addition, other convertible organopolysiloxanes, as, for instance, methyl phenylpolysiloxanes, ethylpolysiloxanes, etc., many examples also of which have been given previously, may be employed in the place of the convertible methylpolysiloxane described in the foregoing examples with equally good results. Various other fillers and modifying agents, such as compression set additives, for instance, mercuric oxide, tertiary butyl quinone, etc., as well as other fillers in varying proportions can be used without departing from the scope of the invention.

As will be evident from the above table, the results obtained unexpectedly do not require any halogenated aliphatic radicals attached to silicon in order to exert their curing action as is required in the recent patent of Earl L. Warrick, U.S. 2,728,743, issued December 27, 1955. The applicant has found unexpectedly that primary aliphatic and aromatic amines are effective in giving results which in many respects under equivalent conditions are essentially as good as those obtained by employing benzoyl peroxide (which is a popular vulcanizing agent for silicone rubber) as the curing agent.

The compositions of the present invention may be employed in making various objects or products which are required to exhibit good resistance to heat and remain flexible at temperatures as low as −100 or −125° C. The compositions herein described in the cured state can be used to make gaskets or can be readily extruded over electrical conductors and then can be heat-treated at elevated temperatures to obtain a smooth, coherent, cured insulation having good thermal stability as well as good flexibility at depressed temperatures. Alternatively, these compositions may be dissolved and/or dispersed in suitable solvents or dispersing agents used for coating and impregnating purposes for coating glass tape, glass fibers, glass fiber sheets, asbestos cloth, etc. In the latter instance, glass cloth can be coated with the convertible organopolysiloxane containing the organic polyamine curing agent herein described as well as a filler, and thereafter the coated glass can be wrapped around mandrels to make heater ducts and cured under heat and pressure to give unitary structures having good heat resistance.

Another application for the curable compositions herein described is in the preparation and manufacture of silicone calking compounds and silicone putties. Because of the ability to cure these putties or calking compounds at temperatures as low as room temperature (which may require longer periods of time, for instance, several days or more at these temperatures, as contrasted to the shorter periods of time at elevated temperatures), they may be used in applications where heat cannot advantageously be employed to effect vulcanization of the silicone elastomer. One application comprises inserting the silicone putty in spaces where it is to be used as a calking compound and the outer surface of the putty which is exposed to the air is then coated or treated with an amine, preferably one which is somewhat soluble in the convertible organopolysiloxane, or using solutions of the organic amine, and the structure allowed to cure at around room temperature (about 25 to 35° C.) for a time sufficient to effect an outer cure while maintaining the elastic soft state internally inside the joint to give still further flexibility and compressibility.

Under some conditions it may be desirable to incorporate other types of curing agents, such as benzoyl peroxide, in addition to the primary aliphatic and aromatic amines employed in the practice of the present invention. By means of this combination of curing agents, it is possible to effect the amine cure at a lower temperature and then to induce a still further cure by means of the peroxide at a higher temperature. The ability to effect this dual cure may be of value in applications where the initial cure of the silicone rubber can be effected only within the lower temperature ranges while the final cure at the higher temperatures can be induced to give under some conditions enhanced properties only because of the fact that an initial cure at the lower temperatures has taken place.

What I claim as new and desire to secure by Letters Patent of the United States is:

1. A curable composition of matter comprising (1) an organopolysiloxane convertible to the cured, solid, elastic state having a viscosity of at least 100,000 centipoises when measured at 25° C. in which the organic groups are monovalent hydrocarbon radicals attached to silicon by carbon-silicon linkages, the hydrocarbon radicals consisting solely of hydrogen and carbon atoms and there being an average of from about 1.98 to 2.05 hydrocarbon radicals per silicon atom, (2) a finely divided silica filler, and (3) a primary amine curing agent selected from the class consisting of aliphatic amines and aromatic amines, any oxygen of said amines being in the form of an ether linkage and said amine curing agent being present, by weight, in an amount equal to from about 0.1 to 10 percent, based on the weight of the convertible organopolysiloxane.

2. The cured, heat-treated product of claim 1.

3. A curable composition of matter comprising (1) a methylpolysiloxane convertible to the cured, solid, elastic state having a viscosity of at least 100,000 centipoises when measured at 25° C., there being an average of from about 1.98 to 2.05 methyl groups per silicon atom, (2) a finely divided silica filler, and (3) a primary amine curing agent selected from the class consisting of aliphatic amines and aromatic amines, any oxygen of said amines being in the form of an ether linkage and said amine curing agent being present, by weight, in an amount equal to from about 0.1 to 10 percent, based on the weight of the convertible methylpolysiloxane.

4. A curable composition of matter comprising (1) a methyl phenylpolysiloxane convertible to the cured, solid, elastic state having a viscosity of at least 100,000 centipoises when measured at 25° C., there being an average of from about 1.98 to 2.05 total methyl and phenyl groups per silicon atom, (2) a finely divided silica filler, and (3) a primary amine curing agent selected from the class consisting of aliphatic amines and aromatic amines, any oxygen of said amines being in the form of an ether linkage and said amine curing agent being present, by weight, in an amount equal to from about 0.1 to 10 percent, based on the weight of the convertible methyl phenylpolysiloxane.

5. A curable composition of matter comprising (1) a methylpolysiloxane convertible to the cured, solid, elastic state having a viscosity of at least 100,000 centipoises when measured at 25° C., there being an average of from about 1.98 to 2.05 methyl groups per silicon atom, (2) a primary amine curing agent selected from the class consisting of aliphatic amines and aromatic amines, any oxygen of said amines being in the form of an ether linkage and said amine curing agent being present, by weight, in an amount equal to from about 0.1 to 10 percent, based on the weight of the convertible methylpolysiloxane, and (3) a silica filler present in an amount equal to at least 25 percent, by weight, of the convertible methylpolysiloxane.

6. A curable composition of matter as in claim 5 in which the primary amine curing agent is bis(p-aminophenyl) methane.

7. A curable composition of matter as in claim 5 in which the primary amine curing agent is p,p'-diaminobiphenyl.

8. A curable composition of matter as in claim 5 in which the primary amine curing agent is p-chloroaniline.

9. A curable composition of matter as in claim 5 in which the primary amine curing agent is 1,6-diaminohexane.

10. A curable composition of matter as in claim 5 in which the primary amine curing agent is tetraethylene pentamine.

11. The process for curing a silica-filled organopolysiloxane convertible to the cured, solid, elastic state having a viscosity of at least 100,000 centipoises when measured at 25° C. in which the organic groups are monovalent hydrocarbon radicals attached to silicon by carbon-silicon linkages, there being an average of from about 1.98 to 2.05 hydrocarbon radicals per silicon atom, the hydrocarbon radicals consisting solely of hydrogen and carbon atoms and which process comprises incorporating in said filled convertible organopolysiloxane a primary amine selected from the class consisting of aliphatic amines and aromatic amines, any oxygen of said amines being in the form of an ether linkage and said amine being present, by weight, in an amount equal to from about 0.1 to 10 percent, based on the weight of the convertible organopolysiloxane, and thereafter heating the mixture of ingredients at an elevated temperature to effect cure of the convertible organopolysiloxane to the cured, solid, elastic state.

12. The process as in claim 11 in which the convertible organopolysiloxane is a methylpolysiloxane and the latter contains a filler homogeneously dispersed therein.

13. The process as in claim 11 in which the convertible organopolysiloxane is a methyl phenylpolysiloxane and the latter contains a filler homogeneously dispersed therein.

References Cited in the file of this patent

UNITED STATES PATENTS

| | | |
|---|---|---|
| 2,658,881 | Hirsch | Nov. 10, 1953 |
| 2,728,743 | Warrick | Dec. 27, 1955 |